(12) United States Patent
Martin et al.

(10) Patent No.: US 7,514,631 B2
(45) Date of Patent: Apr. 7, 2009

(54) SYSTEM AND METHOD FOR MANAGING CABLES IN A DISPLAY BASE

(75) Inventors: Randall W. Martin, The Woodlands, TX (US); Paul L. Drew, The Woodlands, TX (US); Nick Woodley, London (GB); David Quijano, Magnolia, TX (US); Stephen de Saulles, London (GB); Morten Warren, London (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 35 days.

(21) Appl. No.: 11/252,437

(22) Filed: Oct. 17, 2005

(65) Prior Publication Data

US 2007/0084624 A1 Apr. 19, 2007

(51) Int. Cl.
*H02G 3/04* (2006.01)
(52) U.S. Cl. .................. 174/97; 174/481; 174/135; 361/681; 248/920
(58) Field of Classification Search ............... 174/72 A, 174/97, 69, 68.1, 68.2, 95–101, 135, 481, 174/500; 361/686, 681–683; 248/920, 922; 242/402
See application file for complete search history.

(56) References Cited

U.S. PATENT DOCUMENTS

| | | | |
|---|---|---|---|
| 4,681,378 A | 7/1987 | Hellman, III | |
| 4,736,826 A | 4/1988 | White et al. | |
| 4,866,215 A | 9/1989 | Muller et al. | |
| 5,018,052 A | 5/1991 | Ammon et al. | |
| 5,021,968 A | 6/1991 | Ferketic | |
| 5,272,988 A | 12/1993 | Kelley et al. | |
| 5,286,919 A | 2/1994 | Benson et al. | |
| 5,432,505 A | 7/1995 | Wise | |
| 5,473,994 A | 12/1995 | Foley et al. | |
| 5,515,037 A | 5/1996 | Wise | |
| 5,523,747 A | 6/1996 | Wise | |
| 5,541,586 A | 7/1996 | Wise | |
| 5,615,682 A | 4/1997 | Stratz, Sr. | |
| 5,640,482 A | 6/1997 | Barry et al. | |
| 5,769,374 A | 6/1998 | Martin et al. | |
| 5,804,765 A | 9/1998 | Siemon et al. | |
| 5,831,211 A | 11/1998 | Gartung et al. | |
| 5,833,332 A | 11/1998 | Marshall et al. | |
| 5,893,539 A | 4/1999 | Tran et al. | |
| 5,921,402 A | 7/1999 | Magenheimer | |
| 5,957,556 A | 9/1999 | Singer et al. | |
| 6,016,252 A | 1/2000 | Pignolet et al. | |
| 6,050,849 A | 4/2000 | Chang | |

(Continued)

OTHER PUBLICATIONS

Ergotron, Flat Panel Mounting Solutions, Desk Stand 100- Range of Motion, Copyright 2005 (search completed Sep. 30, 2005) (2 pgs.) (http://www.ergotron.com/3_products/flat_panel/deskstands/range.asp).

*Primary Examiner*—Dhiru R Patel

(57) ABSTRACT

Embodiments of the present technique relate to a system and method for managing cables in a display base. One embodiment includes a display base having a cable passage between a pliable flap and a footing, the cable passage traversing a portion of the display base, and a display coupled to the display base. Another embodiment includes a base adapted to couple and support a display, where the base has a footing and pliable flap extending at least partially across and lengthwise along a cable route on the base.

13 Claims, 7 Drawing Sheets

U.S. PATENT DOCUMENTS

| | | |
|---|---|---|
| 6,202,567 B1 | 3/2001 | Funk et al. |
| 6,284,978 B1 | 9/2001 | Pavillard et al. |
| 6,303,864 B1 | 10/2001 | Johnson et al. |
| 6,305,556 B1 | 10/2001 | Mayer |
| 6,326,547 B1 | 12/2001 | Saxby et al. |
| 6,327,139 B1 | 12/2001 | Champion et al. |
| 6,330,168 B1 | 12/2001 | Pedoeem et al. |
| 6,363,198 B1 | 3/2002 | Braga et al. |
| 6,407,933 B1 | 6/2002 | Bolognia et al. |
| 6,409,134 B1 | 6/2002 | Oddsen, Jr. |
| 6,427,936 B1 | 8/2002 | Noel et al. |
| 6,435,106 B2 | 8/2002 | Funk et al. |
| 6,435,354 B1 | 8/2002 | Gray et al. |
| 6,442,030 B1 * | 8/2002 | Mammoser et al. ......... 361/727 |
| 6,476,323 B2 * | 11/2002 | Beebe et al. ............... 174/72 A |
| 6,483,709 B1 | 11/2002 | Layton |
| 6,525,273 B1 | 2/2003 | Cunningham |
| 6,533,723 B1 | 3/2003 | Lockery et al. |
| 6,546,181 B1 | 4/2003 | Adapathya et al. |
| 6,554,218 B2 | 4/2003 | Buyce et al. |
| D477,325 S | 7/2003 | Theis et al. |
| 6,600,665 B2 | 7/2003 | Lauchner |
| 6,609,691 B2 | 8/2003 | Oddsen, Jr. |
| 6,619,606 B2 | 9/2003 | Oddsen, Jr. et al. |
| 6,637,104 B1 | 10/2003 | Masuda et al. |
| 6,656,893 B2 | 12/2003 | Saito et al. |
| 6,713,678 B2 | 3/2004 | Masuda et al. |
| 6,719,253 B2 | 4/2004 | Oddsen, Jr. |
| 6,721,414 B1 | 4/2004 | Rojas et al. |
| 6,724,970 B2 | 4/2004 | Adapathya et al. |
| 6,726,167 B2 | 4/2004 | Oddsen, Jr. |
| 6,805,248 B2 | 10/2004 | Champion et al. |
| 6,811,039 B2 | 11/2004 | Chen et al. |
| 6,856,505 B1 | 2/2005 | Venegas et al. |
| 6,902,069 B2 | 6/2005 | Hartman et al. |
| 6,915,994 B2 | 7/2005 | Oddsen, Jr. |
| 2001/0013305 A1 | 8/2001 | Funk et al. |
| 2001/0023914 A1 | 9/2001 | Oddsen, Jr. |
| 2001/0024904 A1 | 9/2001 | Fischer |
| 2002/0066843 A1 | 6/2002 | Oddsen, Jr. et al. |
| 2002/0073516 A1 | 6/2002 | Behar |
| 2002/0074460 A1 | 6/2002 | Behar |
| 2003/0010862 A1 | 1/2003 | Buyce et al. |
| 2003/0026084 A1 | 2/2003 | Lauchner |
| 2003/0037953 A1 | 2/2003 | Sarkinen et al. |
| 2003/0066936 A1 | 4/2003 | Beck et al. |
| 2003/0075646 A1 | 4/2003 | Womack et al. |
| 2003/0075655 A1 | 4/2003 | Oddsen, Jr. |
| 2003/0080268 A1 | 5/2003 | Oddsen, Jr. |
| 2003/0123832 A1 | 7/2003 | Adapathya et al. |
| 2003/0168238 A1 | 9/2003 | Masuda et al. |
| 2003/0222034 A1 | 12/2003 | Champion et al. |
| 2003/0234328 A1 | 12/2003 | Oddsen, Jr. |
| 2004/0047115 A1 * | 3/2004 | Helot et al. ................. 361/681 |
| 2004/0065787 A1 | 4/2004 | Hardt et al. |
| 2004/0079711 A1 | 4/2004 | Hartman et al. |
| 2004/0108289 A1 | 6/2004 | Chen et al. |
| 2004/0114313 A1 | 6/2004 | Mata et al. |
| 2004/0149533 A1 | 8/2004 | Milano |
| 2004/0182798 A1 | 9/2004 | Williams |
| 2004/0222344 A1 | 11/2004 | Oddsen, Jr. |
| 2005/0057912 A1 | 3/2005 | Hardt et al. |
| 2005/0067358 A1 | 3/2005 | Lee et al. |
| 2005/0076479 A1 | 4/2005 | Rolla et al. |
| 2005/0135767 A1 | 6/2005 | Diaz et al. |

* cited by examiner

SYSTEM AND METHOD FOR MANAGING CABLES IN A DISPLAY BASE

BACKGROUND

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Home entertainment systems, personal computer systems, and the like generally include displays with display bases that receive power and communicate with other devices via cables. These displays are often implemented with other components, and peripheral devices that generally occupy the same workspace or area. For example, a flat panel computer display and its base are often utilized along with optional accessories such as keyboards, mice, personal digital assistant (PDA) docks, central processing units (CPUs), speakers, cameras, and so forth. The peripheral devices, other components, and the display itself often utilize various combinations of cables (e.g., signal cables and power cables) to operate and communicate with one another.

Unfortunately, it can be cumbersome to have a number of cables from various devices and peripherals in the same area. Indeed, the various cables can become tangled and disorganized, resulting in an unaesthetic appearance and logistical issues relating to connecting and disconnecting the cables. For example, devices can become dislodged or disconnected due to cables being snagged or pulled inadvertently.

BRIEF DESCRIPTION OF THE DRAWINGS

Advantages of one or more disclosed embodiments may become apparent upon reading the following detailed description and upon reference to the drawings in which.

DETAILED DESCRIPTION

One or more specific embodiments of the present technique will be described below. In an effort to provide a concise description of these embodiments, not all features of an actual implementation are described in the specification. It should be appreciated that in the development of any such actual implementation, as in any engineering or design project, numerous implementation-specific decisions will be made to achieve the developers' specific goals, such as compliance with system-related and business-related constraints, which can vary from one implementation to another. Moreover, it should be appreciated that such a development effort can be complex and time consuming, but would remain a routine undertaking of design, fabrication, and manufacture for those of ordinary skill having the benefit of this disclosure. It should be noted that illustrated embodiments of the present technique throughout this text represent a general case.

Embodiments of the present technique generally relate to efficiently and aesthetically managing cables in a limited workspace. Specifically, embodiments of the present technique relate to a cable routing system for a display base, which may be defined as a supporting part or a foundation of a display (e.g., the base of a monitor, video screen, all-in-one computer, panel computer, liquid crystal display or television, plasma display or television, or conventional television). Such a routing system facilitates flexible organization, retention, and concealment of cables for peripheral components disposed about and/or on the display base, such as cables extending from a display situated atop the display base. Flexible material employed in the display base can accommodate a variety of sizes and quantities of cables due to the flexible nature of the material. In addition, the flexible material enables removable retention of the cables without using tools or threaded fasteners. Accordingly, a user can mount the cables by simply sliding or pushing the cables under the flexible material. As discussed in detail below, the disclosed routing system includes a length of flexible or pliable material (e.g., a pliable flap) disposed over the cables along a cable passage or route, such that the cables can be easily retained or removed from within the display base along an edge or through an opening in the pliable material.

Figure 1:
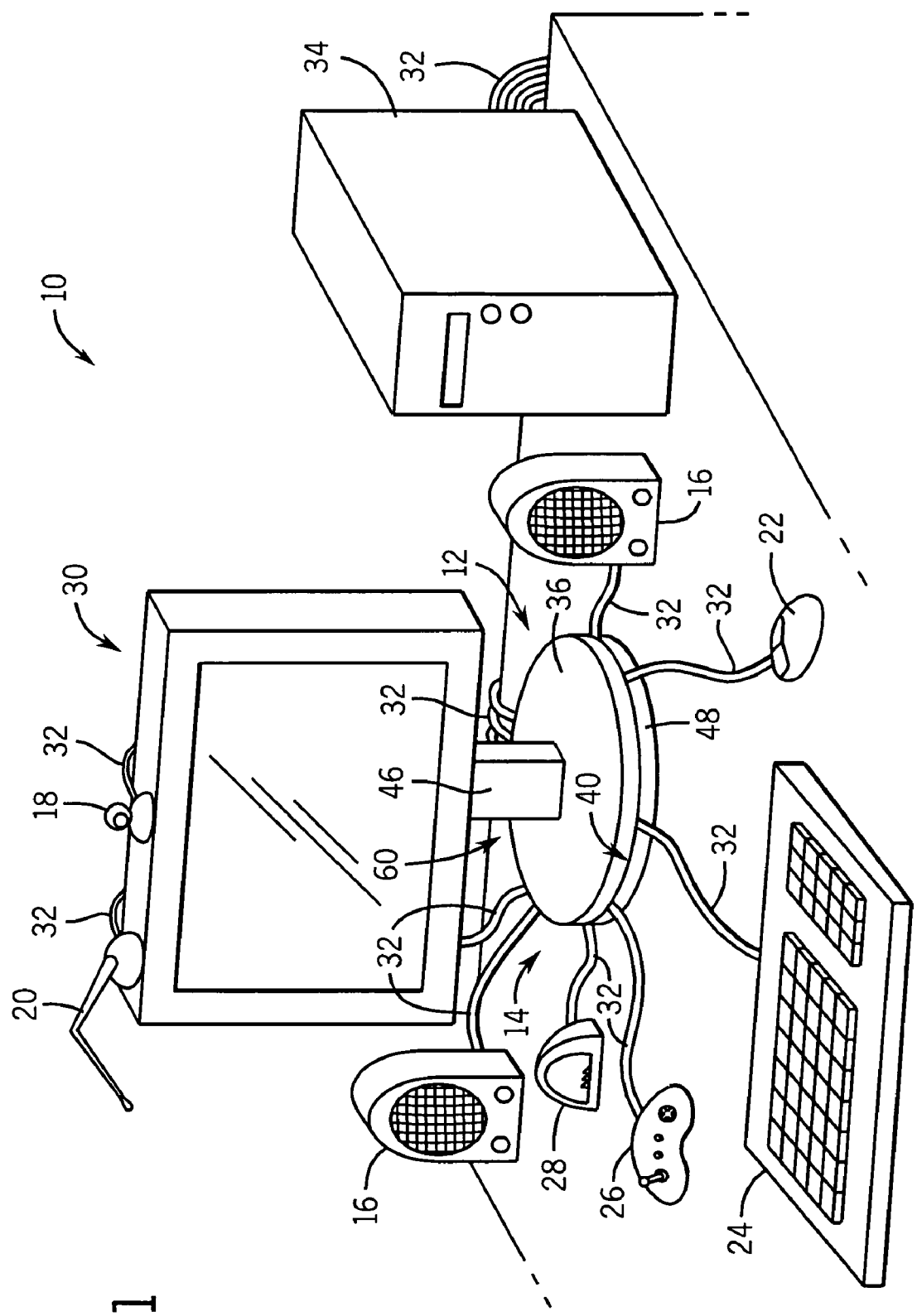
FIG. 1 is a perspective view of a computer system with various peripheral components disposed about a display and its base, the computer system having cables that pass through a cable routing system on the display base in accordance with embodiments of the present technique.

FIG. 1 is a perspective view of a computer system 10 having a cable routing system 12 on a display base 14 in accordance with present embodiments. Specifically, FIG. 1 depicts the computer system 10 with various peripheral components 16, 18, 20, 22, 24, 26, 28 disposed about the display base 14 and a corresponding display 30. The various peripherals 16, 18, 20, 22, 24, 26, 28 and the display 30 have cables 32 that pass through the cable routing system 12 on the display base 14. These cables 32 include power and/or a communication cables. It should be noted that in some embodiments, the cables 32 include those from devices only tangentially related to the computer system 10, such as cables that extend from other devices near the display base 14. For example, the cables 32 can include cables from an alarm clock, electric pencil sharpener, or electric stapler disposed in or near the workspace surrounding the computer system 10.

The cable routing system 12 flexibly organizes, retains, and conceals all or a portion of the cables 32 from view as they are routed along the display base 14 for connection to a computer 34, to other peripheral components, and/or to the display 30. In the illustrated embodiment, the cables 32 from the peripheral components 16, 18, 20, 22, 24, 26, 28 couple to the display base 14 via the cable routing system 12 and are accumulated near the rear of the display base 14. This facilitates connection of the massed cables 32 to the computer 34. It should be noted that in some embodiments, the cables 32 are massed at an exit portal in the cable routing system 12, thus organizing the cables 32 into a group, facilitating efficient use of space, and improving aesthetic appeal. Further, in some embodiments, a connector block is included that communicatively couples to one or multiple of the peripheral components (e.g., 16, 18, 20, 22, 24, 26, 28) and/or the display 30. Such connector blocks can provide a single point of access via an umbilical cable (e.g., a cable adapted to transmit power and/or communication signals to and from a number of devices). Additionally, it should be noted that the connector block can be integral or separate from the cable routing system 12.

Figure 2:
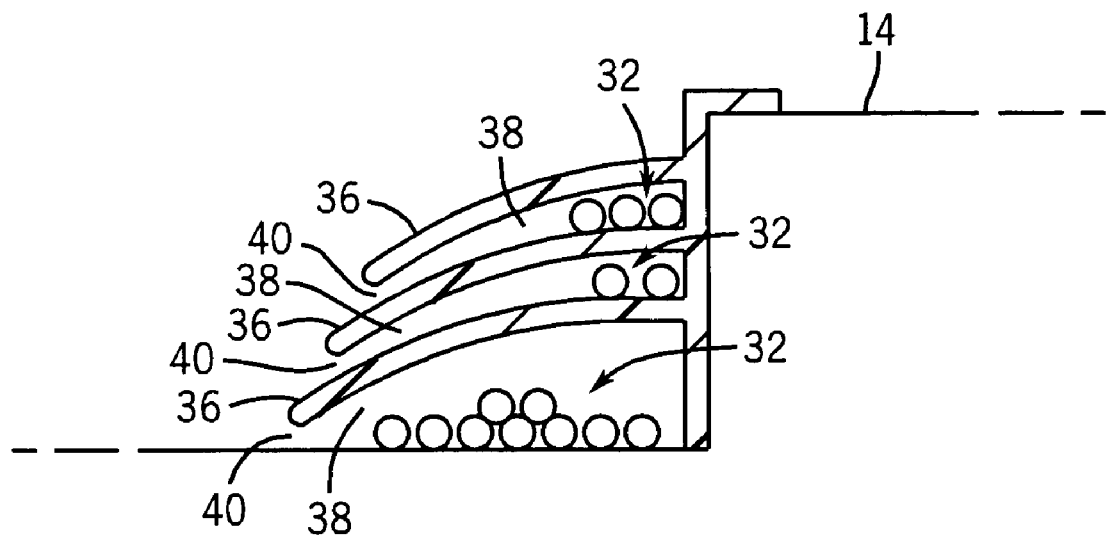
FIG. 2 is a cross-sectional view of multiple flexible lips of the cable routing system, the multiple flexible lips being stacked atop one another to provide layers of cable passages in accordance with embodiments of the present technique.

The cables 32 are routed underneath a strip of flexible material, a pliable flap, or flexible lip 36 of the cable routing system 12. The flexible lip 36 extends outward from a connection point on the display base 14 and forms a cable passage along the periphery of the display base 14. In some embodiments, the cable passage is formed along different portions (e.g., along the middle) of the display base 14. For example, in one embodiment, the flexible lip 36 forms a large cavity over a central portion of the display base 14, thus providing storage and concealment for a large number of cables 32. Indeed, the flexible lip 36 can comprise a flap that covers a majority of the upper surface of the display base 14 and that creates a large cable passage, as illustrated in FIG. 1. Further, in some embodiments, multiple flexible lips 36 are employed. For example, FIG. 2 is a cross-sectional view that illustrates multiple flexible lips 36 stacked atop one another to provide layers of cable passages 38. Having multiple layers of cable passages 38 enables a user to organize cables 32 according to layer. Moreover, the extra layers provide routing and concealment for additional cables 32.

Figure 3:
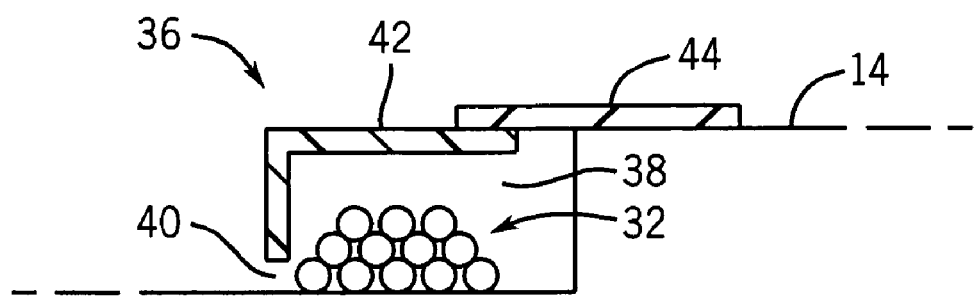
FIG. 3 is a cross-sectional view of the flexible lip adjacent the display base, the flexible lip having a rigid portion and a flexible portion that operates as a biased hinge in accordance with embodiments of the present technique.

As illustrated in FIG. 1, the flexible lip 36 extends lengthwise along the periphery of the base, forming a portion of the cable routing system 12. Access to the cable routing system 12 is provided by a slit, groove, or general opening 40 that enables insertion and removal of the cables 32. In one embodiment, the flexible lip 36 includes a single piece or strip of flexible material (e.g., rubber) secured to the display base 14 via an adhesive, screws, latches, or other fasteners. In another embodiment, as illustrated by FIG. 3, the flexible lip 36 includes a rigid portion 42 and a flexible portion 44 that operates as a biased hinge. The rigid portion 42 lifts up to receive the cables 32 and then the flexible portion 44 causes it to flex back into place, thus retaining the cables 32 in position. The flexible lip 36 is biased against the display base 14 or another flexible lip 36 such that when the cable 32 is routed underneath the flexible lip 36, the cable 32 is retained (e.g., pressed against the display base 14) and at least partially concealed by the flexible lip 36. In one embodiment, the flexible lip 36 is adapted to retain the cable in a chamber separate from the flexible lip 36.

The peripheral components illustrated in FIG. 1 include speakers 16, a camera 18, a microphone 20, a mouse 22, a keyboard 24, a game controller 26, and a personal digital assistant (PDA) recharging/linking cradle 28. These are exemplary peripheral components, and it should be noted that different peripheral components can be incorporated in other embodiments. Also, while in the illustrated embodiment the display 30 is a flat panel computer monitor, in other embodiments, the display 30 can include a television, a cathode ray tube (CRT), a laptop display, an all-in-one computer, a panel computer, and so forth. For example, the all-in-one computer generally includes the display 30 and computer (e.g., processor, motherboard, memory, disc drive, video card, and audio card) all in a single enclosure. By further example, the panel computer includes a flat-panel display 30 and computer disposed in a single panel-shaped housing.

Figure 4:
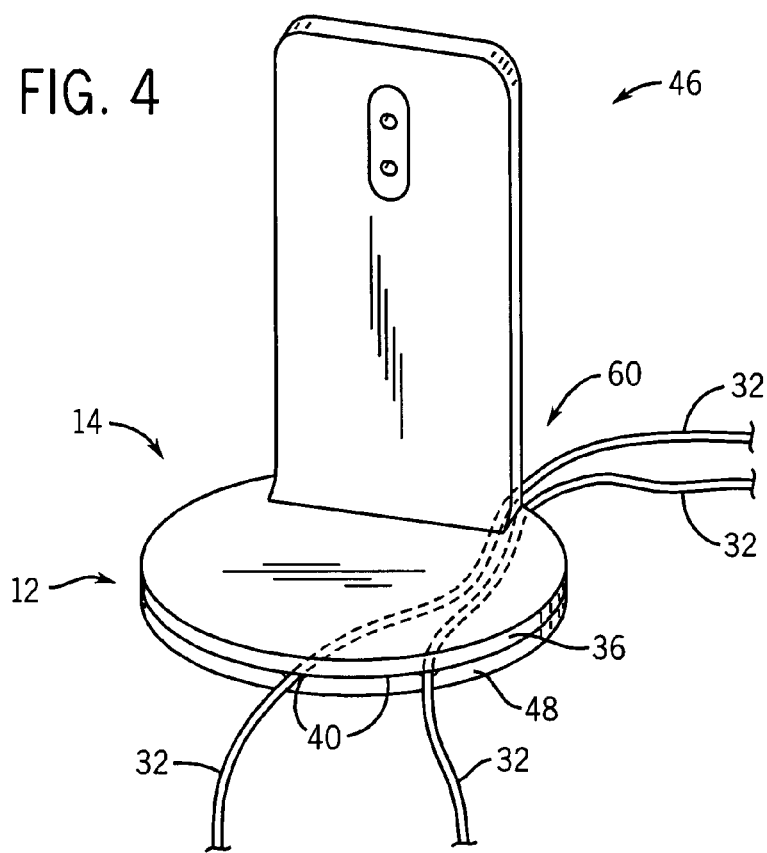
FIG. 4 is a perspective view of the display base and the cable routing system coupled to a display stand, wherein the cable routing system is formed by a pliable flap of the display base and a footing of the display base in accordance with embodiments of the present technique.

FIG. 4 is a perspective view of the display base 14 coupled to a display stand 46. The display stand 46 facilitates coupling of the display base 14 to the display 30, as illustrated in FIG. 1. In the embodiment illustrated by FIG. 4, the cable routing system 12 is formed by two adjacent portions of the display base 14—the pliable flap 36 and a footing 48. The pliable flap 36 is an upper portion of the base and the footing 48 is a lower portion of the base. Other embodiments have different configurations. In some embodiments, the footing 48 is replaced by other suitable adjacent portions. For example, in the embodiment illustrated by FIG. 5, the two adjacent portions are vertically aligned pliable lips 50 and 52 and the opening 40 is between the pliable lips 50, 52.

Figure 5:
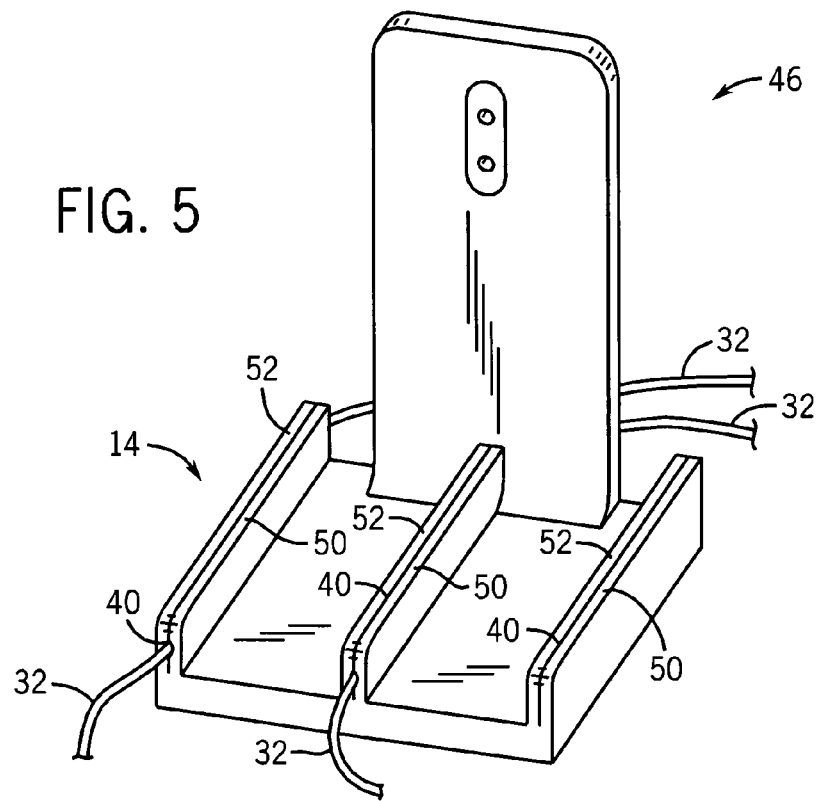
FIG. 5 is a perspective view of the display base and the cable routing system coupled to the display stand, wherein the cable routing system is formed by two vertically aligned pliable lips extending upward from the display base in accordance with embodiments of the present technique.

The display base 14 can have various shapes, contours, and other geometric features. FIG. 5 is a perspective view of the display base 14 coupled to the display stand 46, wherein the routing system 12 includes three sets of parallel vertically aligned pliable lips 50, 52. The main body of the display base 14 is generally rectangular in shape and is substantially flat. In other embodiments the display base 14 includes different shapes and contours. For example, the display base 14 may have a convex upper side that extends toward where the display 30 would be located. In another example, as illustrated by FIGS. 1 and 4, the display base 14 is generally a flat circular foundation that connects to the display 30 via the display stand 46.

Figure 6:
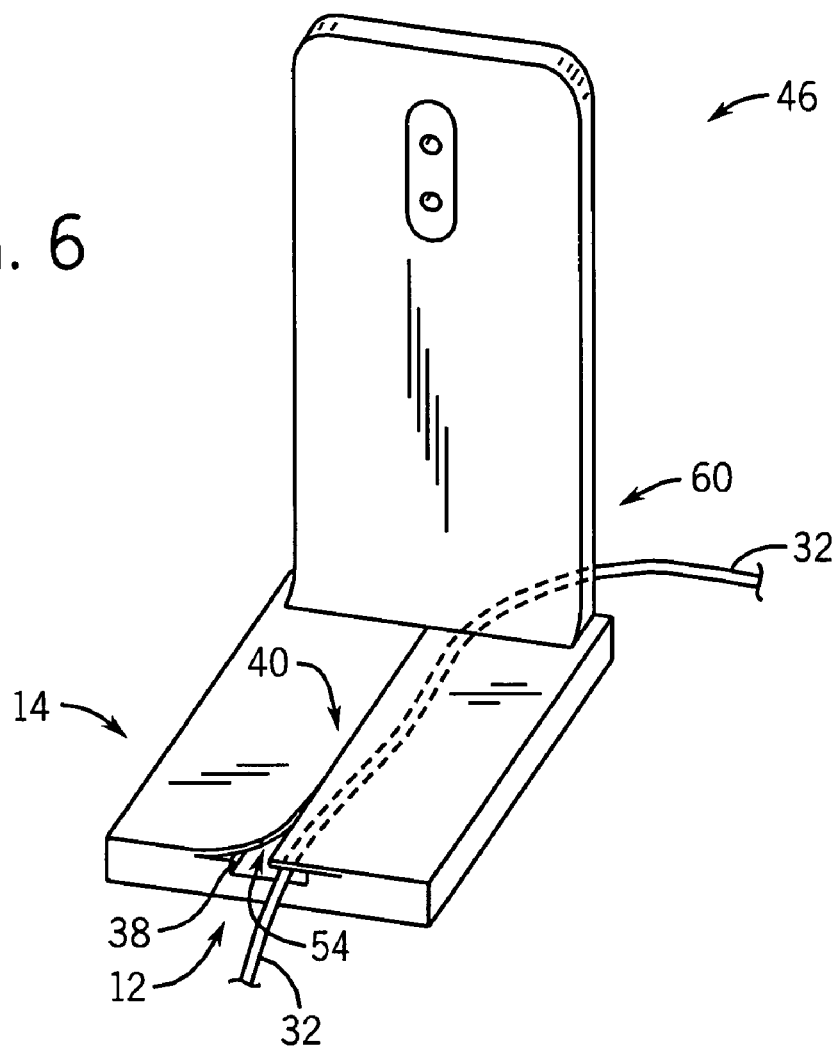
FIG. 6 is a perspective view of the display base and the cable routing system coupled to the display stand, wherein the cable routing system includes a cable channel that receives and routes the cables along the cable passage of the cable routing system in accordance with embodiments of the present technique.

Further, while the cable routing system 12 illustrated by FIGS. 1 and 4 is disposed substantially along a perimeter of the display base 14 and has the access opening 40 along the perimeter, in other embodiments, the cable routing system 12 is disposed on different portions of the display base 14. For example, FIG. 5 illustrates the cable routing system 12 disposed along the top of the display base 14, wherein the vertically aligned pliable lips 50, 52 provide openings 40 that face upward and forward and run along the length of the display base 14. FIG. 6 is a perspective view of the display base 14 coupled to the display stand 46, wherein the cable routing system 12 is accessible through the opening 40 disposed in a central portion of the display base 14.

Figure 7:
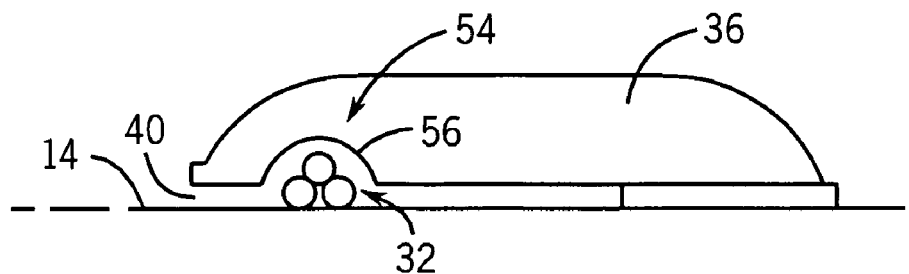
FIG. 7 is a cross-sectional view of the flexible lip adjacent the display base, the flexible lip having a U-shaped recess that forms a cable channel for routing the cables in accordance with embodiments of the present technique.
Figure 8:
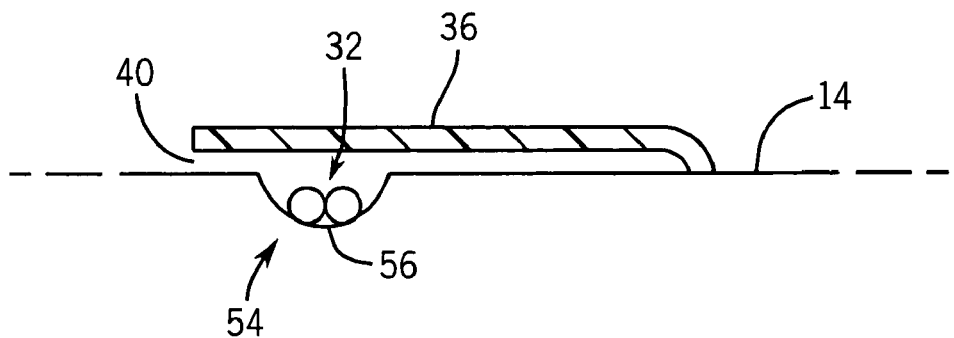
FIG. 8 is a cross-sectional view of the flexible lip adjacent the display base, the display base having a U-shaped recess that forms a cable channel for routing the cables in accordance with embodiments of the present technique.
Figure 9:
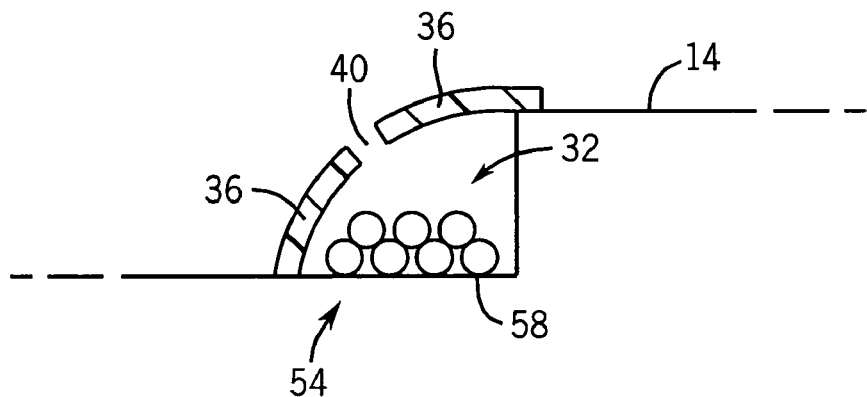
FIG. 9 is a cross-sectional view of the flexible lip adjacent the display base, the display base having an L-shaped recess that forms a cable channel for routing the cables and the flexible lip having a centralized access opening in accordance with embodiments of the present technique.
Figure 10:
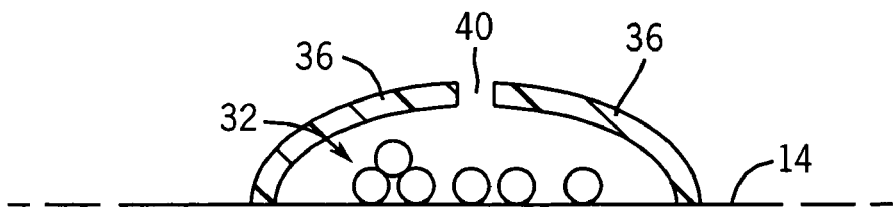
FIG. 10 is a cross-sectional view of the flexible lip adjacent the display base, the flexible lip and display base forming a cavity that operates as a cable passage in accordance with embodiments of the present technique.

In the embodiment illustrated by FIG. 6, the cable routing system 12 includes a cable channel 54 that receives and route the cables 32 along the cable passage 38 of the cable routing system 12. The cable channel 54 facilitates retention and concealment of the cables 32 and provides a guide for routing the cables 32. In some embodiments, a cable channel 54 is disposed in the flexible lip 36, in a panel (e.g., the footing 48) adjacent the flexible lip 36, or in both the flexible lip 36 and the panel. For example, in the embodiment illustrated by FIG. 7, the cable channel 54 is a U-shaped recess 56 in the flexible lip 36. In another embodiment, the cable channel 54 is a U-shaped recess 56 in a panel of the display base 14 adjacent the flexible lip 36, as illustrated in FIG. 8. In yet another embodiment, the cable channel 54 is an L-shaped portion 58 of a panel of the display base 14 adjacent the flexible lip 36, as illustrated by FIG. 9. Further, the cable channel 54 can include a cavity or passage between a surface (flat or recessed) of the display base 14 or cable routing system 12 and the flexible lip 36, as illustrated in FIG. 10. It should be noted that FIGS. 9 and 10 also illustrate a central placement of the opening 40 in the flexible lip 36.

In the embodiments illustrated by FIGS. 1, 4 and 6, the cable channel 54 routes the cable 32 along the perimeter of the cable routing system 12 or directly through the display base 14 to an exit portal 60 near the back of the display base 14. The exit portal 60 facilitates connection of the various peripheral devices 16, 18, 20, 22, 24, 26, the display 30, and so forth to other equipment. Additionally, the exit portal 60 facilitates arrangement of the cables 32 within the cable routing system 12. In some embodiments, the cable routing system 12 is designed such that the cables 32 can enter the cable routing system 12 at a number of locations along the perimeter of the cable routing system 12 via the opening 40. Once the cables 32 are gathered, the cables 32 can then uniformly exit the cable routing system 12 at the exit portal 60 for connection to other components (e.g., computer 34).

Figure 11:
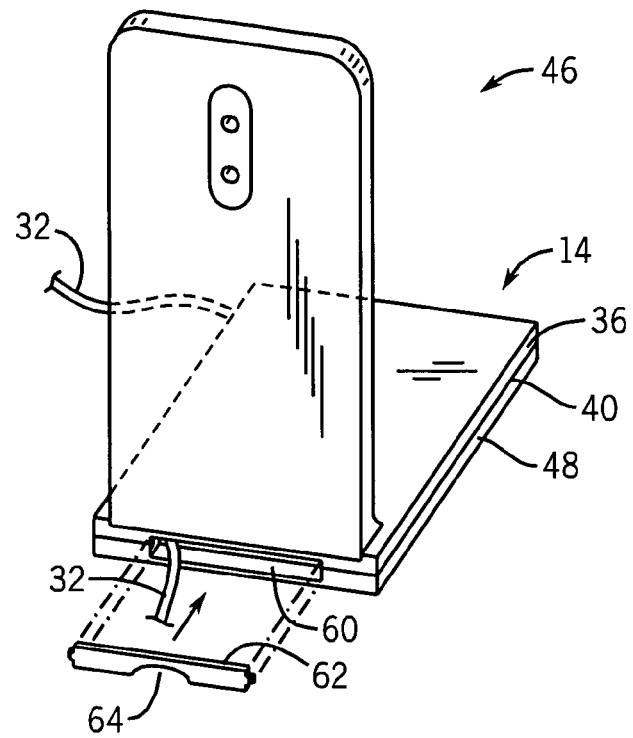
FIG. 11 is a perspective view of the rear of the display base and the cable routing system, wherein an exit portal cover is being disposed over an exit portal in the cable routing system in accordance with embodiments of the present technique.

In some embodiments, to improve aesthetic appeal of the display base 14 and to further organize and retain the cables 32, an exit portal cover 62 is provided, as illustrated in FIG. 11. Specifically, FIG. 11 depicts the exit portal cover 62 being disposed over the exit portal 60, to provide additional concealment, support, and securement for the cables 32. When this exit portal cover 62 is removed, ready access is provided to the cables 32 stored in the cable routing system 12. Having this accessibility facilitates insertion, extraction, and manipulation of the cables 32 in the cable routing system 12 via the exit portal 60. When the exit portal cover 62 is in place over and affixed proximate the exit portal 60, the cables 32 are contained and at least partially concealed from view. The exit portal cover 62 includes a slot 64 that provides a discreet (e.g., smaller) access point for the cables 32, thus improving aesthetic appeal, conserving workspace, and improving organization of the cables 32.

Figure 12:
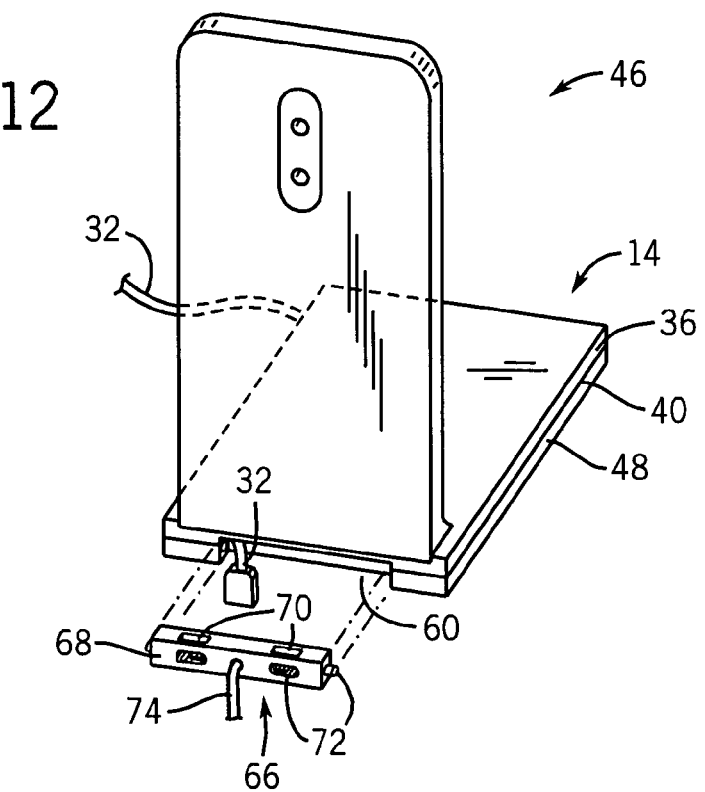
FIG. 12 is a perspective view of the rear of the display base and the cable routing system, wherein a connector block is utilized to consolidate cables disposed within the cable routing system in accordance with embodiments of the present technique.

FIG. 12 is a perspective view of yet another embodiment of the present technique, wherein a connector block 66 is utilized to consolidate cables 32 and improve organization. Specifically, FIG. 12 depicts the display base 14 having the cable routing system 12 with the exit portal 60 being coupled with the connector block 66 at the exit portal 60. The connector block 66 is adapted or configured to couple to the cable routing system 12 and the cables 32. Specifically, the connector block 66 is adapted or configured to communicatively couple to one or multiple of the cables 32 disposed within the cable routing system 12. Thus, the connector block 66 provides a single point of access to the multiple cables 32 and their corresponding components (e.g., peripheral devices 16, 18, 20, 22, 24, 26, 28 and display 30). In the illustrated embodiment, the connector block 66 comprises a main body 68, a plurality of reception ports 70 for coupling to the various cables 32, a tool-free quick connect/release mechanism 72 for attaching and detaching from the cable routing system 12, and a single umbilical cable 74 that consolidates the attached cables 32. The umbilical cable 74 facilitates communicative connection to a device (e.g., computer 34 and/or a power source) and transmission of information and/or power between the device and the cables 32 via the reception ports 70. Additionally, the umbilical cable 74 acts as an extension cord, providing additional length for coupling the cables 32 to other components.

It should be noted that in some embodiments, the tool-free quick connect/release mechanism 72 of the connector block 66 is replaced or supplemented by other connection mechanisms. For example, in some embodiments, latches, screws, male and female components, and so forth can be utilized in place of or in support of the tool-free quick connect/release mechanism 72. Further, it should be noted that while in the illustrated embodiment, the connector block 66 is separate from the cable routing system 12, in other embodiments it is an integral part. In some embodiments, the connector block 66 is integral to the cable routing system 12.

Figure 13:
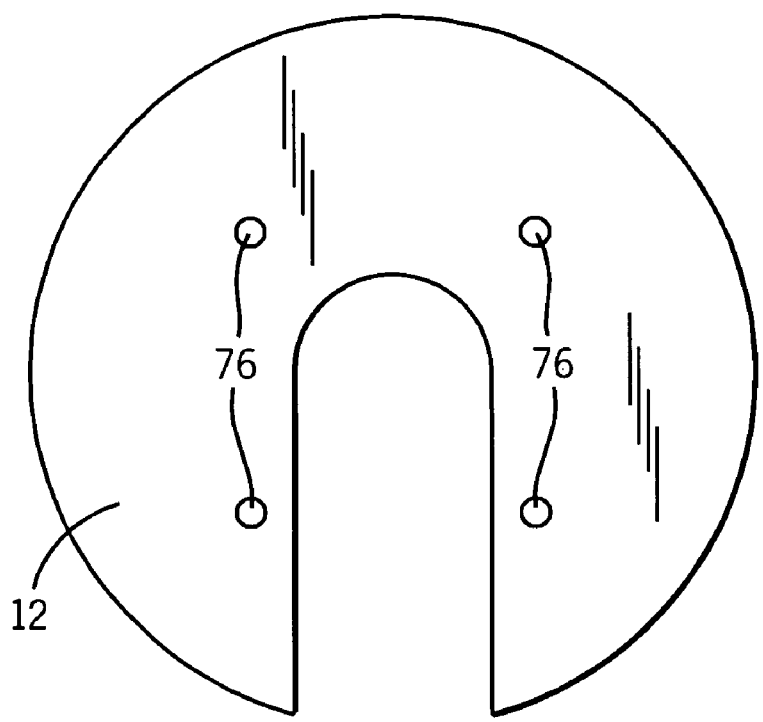
FIG. 13 is a plan view of the cable routing system separate or disconnected from the display base in accordance with embodiments of the present technique.

FIG. 13 is a plan view of the cable routing system 12 separate or disconnected from the display base 14, illustrating one embodiment of the present technique. The cable routing system 12 is adapted to attach to the display base 14 and to detach therefrom. For example, in the illustrated embodiment, the cable routing system 12 includes attachment points 76 that can be used with screws to couple to the display base 14. In other embodiments, latches, spring-loaded pins, male and female connectors, adhesives, tape and so forth can be utilized to couple the cable routing system 12 to the display base 14. For example, in one embodiment the cable routing system 12 has a tacky side that allows for removable coupling to the display base 14 by pressing the tacky side against the display base 14. The cable routing system 12 can couple to the upper or lower portion of a standard display base. Further, in some embodiments, the cable routing system can couple to side portions of a standard display base.

Providing the cable routing system 12 separate from the display base 14 facilitates transfer of the cable routing system 12 between multiple display bases 14. Further, by facilitating detachment and reattachment of the cable routing system 12 with the display bases 14, a user can dispose cables 32 within the cable routing system 12 prior to connecting the cable routing system to the display base 14. In some embodiments, this improves efficiency and ease of use.

While the present technique may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A cable management apparatus, comprising:

a display having a pliable flap attached thereto; a display base adapted to couple to and support the display, the base comprising: a footing; and said pliable flap extending at least partially across and lengthwise along a cable route on the base.

2. The apparatus of claim 1, wherein the pliable flap and the cable route are disposed along a perimeter of the display base.

3. The apparatus of claim 1, wherein the pliable flap is removably coupled to the footing.

4. The apparatus of claim 1, wherein the pliable flap comprises a sheet horizontally parallel to the footing.

5. The apparatus of claim 1, wherein the resilient cable is a rubber cable cover.

6. A cable management apparatus, comprising:
a display having a pliable flap attached thereto; a display stand comprising an upright display support coupled to a base; and a resilient cable flap extending over a cable route which passes through from a first opening at first side of the base to a second opening at a second side of the base.

7. The apparatus of claim 6, wherein the resilient cable cover comprises a resilient sheet.

8. The apparatus of claim 6, wherein the resilient cable cover comprises a resilient strip extending lengthwise along the cable route.

9. The apparatus of claim 6, wherein the resilient cable cover is a rubber cable cover.

10. A cable management apparatus, comprising: a display having a pliable flap attached thereto, coupled to a display base; and a cable passage extending between said flap and an adjacent portion of the display base, wherein the flap at least substantially conceals the cable passage, and wherein the flap is configured to bias a cable against the display base upon receipt of the cable along an edge of the flap.

11. The apparatus of claim 10, wherein the cable passage is integrally defined by the display base and the flexible layer of material.

12. The apparatus of claim 10, wherein the flexible layer of material is free to flex from an attached portion to the edge of the flexible layer of material.

13. The new apparatus of claim 10, wherein the flexible layer of material covers the entire upper surface of the display base.

* * * * *

UNITED STATES PATENT AND TRADEMARK OFFICE
CERTIFICATE OF CORRECTION

| | | |
|---|---|---|
| PATENT NO. | : 7,514,631 B2 | |
| APPLICATION NO. | : 11/252437 | |
| DATED | : April 7, 2009 | |
| INVENTOR(S) | : Randall W. Martin et al. | |

It is certified that error appears in the above-identified patent and that said Letters Patent is hereby corrected as shown below:

In column 7, line 3, in Claim 1, before "base" insert -- display --.

In column 7, lines 12-13, in Claim 5, delete "the resilient cable is a rubber cable cover." and insert -- the cable route extends entirely along the display base. --, therefor.

In column 7, line 19, in Claim 6, after "at" insert -- a --.

In column 7, line 22, in Claim 7, delete "cover" and insert -- flap --, therefor.

In column 8, line 2, in Claim 8, delete "cover" and insert -- flap --, therefor.

In column 8, line 5, in Claim 9, delete "cover" and insert -- flap --, therefor.

In column 8, lines 14-15, in Claim 11, delete "the flexible layer of material." and insert -- the flap. --, therefor.

In column 8, lines 16-17, in Claim 12, delete "the flexible layer of material" and insert -- the flap --, therefor.

In column 8, line 18, in Claim 12, delete "the flexible layer of material." and insert -- the flap. --, therefor.

In column 8, line 19, in Claim 13, after "The" delete "new".

UNITED STATES PATENT AND TRADEMARK OFFICE
CERTIFICATE OF CORRECTION

PATENT NO. : 7,514,631 B2
APPLICATION NO. : 11/252437
DATED : April 7, 2009
INVENTOR(S) : Randall W. Martin et al.

It is certified that error appears in the above-identified patent and that said Letters Patent is hereby corrected as shown below:

In column 8, lines 19-20, in Claim 13, delete "the flexible layer of material" and insert -- the flap --, therefor.

Signed and Sealed this

Tenth Day of November, 2009

David J. Kappos
*Director of the United States Patent and Trademark Office*